United States Patent
Luo et al.

(10) Patent No.: US 9,516,520 B2
(45) Date of Patent: Dec. 6, 2016

(54) ENABLING COEXISTENCE OF DIFFERENTLY-CAPABLE USER EQUIPMENT

(71) Applicant: QUALCOMM Incorporated, San Diego, CA (US)

(72) Inventors: Tao Luo, San Diego, CA (US); Yi Huang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 115 days.

(21) Appl. No.: 14/515,192

(22) Filed: Oct. 15, 2014

(65) Prior Publication Data

US 2015/0117362 A1    Apr. 30, 2015

Related U.S. Application Data

(60) Provisional application No. 61/897,715, filed on Oct. 30, 2013.

(51) Int. Cl.
*H04W 24/02* (2009.01)
*H04W 72/12* (2009.01)

(52) U.S. Cl.
CPC ........... *H04W 24/02* (2013.01); *H04W 72/121* (2013.01)

(58) Field of Classification Search
CPC .................................................... H04W 24/02
See application file for complete search history.

(56) References Cited

U.S. PATENT DOCUMENTS

2011/0176498 A1    7/2011   Montojo et al.

FOREIGN PATENT DOCUMENTS

| EP | 2291018 A1 | 3/2011 |
| WO | WO-2012079757 A1 | 6/2012 |

OTHER PUBLICATIONS

International Search Report and Written Opinion—PCT/US2014/060885—ISA/EPO—Feb. 6, 2015.

*Primary Examiner* — Dang Ton
*Assistant Examiner* — Kevin Lee
(74) *Attorney, Agent, or Firm* — Norton Rose Fulbright US LLP

(57) ABSTRACT

Managing the coexistence of multiple different UE types and capabilities in wireless networks is disclosed. In order to handle the various transmission types and available UE capabilities, base stations may coordinate among each other over backhaul communications to schedule identifiable groups of UEs being served for specific sets of resources. The resources may be assigned, and UEs grouped, according to particular transmission types, UE capabilities, or a combination of both. Additional aspects may also provide for signaling to the UE that informs the UE of expected transmission types for given resources. The combined aspects facilitate reducing complexity of UE signal processing for data interference cancellation, signal decoding, and the like.

14 Claims, 7 Drawing Sheets

ENABLING COEXISTENCE OF DIFFERENTLY-CAPABLE USER EQUIPMENT

CROSS-REFERENCE TO RELATED APPLICATIONS

This application claims the benefit of U.S. Provisional Patent Application No. 61/897,715, entitled, "ENABLING COEXISTENCE OF DIFFERENTLY-CAPABLE USER EQUIPMENT", filed on Oct. 30, 2013, which is expressly incorporated by reference herein in its entirety.

BACKGROUND

Field

Aspects of the present disclosure relate generally to wireless communication systems, and more particularly, to enabling coexistence of differently-capable user equipments (UEs) within various wireless networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to enabling and managing the coexistence of multiple different UE types and capabilities in wireless networks. In order to handle the various transmission types and available UE capabilities, base stations may coordinate among each other over backhaul communications to schedule identifiable groups of UEs being served for specific sets of resources. The resources may be assigned, and UEs grouped, according to particular transmission types, UE capabilities, or a combination of both. Additional aspects may also provide for signaling to the UE that informs the UE of expected transmission types for given resources. The combined aspects facilitate reducing complexity of UE signal processing for data interference cancellation, signal decoding, and the like.

In one aspect of the disclosure, a method of wireless communication includes receiving, at a first base station, a request from a second base station to schedule one or more identifiable sets of UEs for a corresponding identified set of resources, identifying, by the first base station, one or more UEs according to parameters defining the one or more identifiable sets of UEs, and scheduling, by the first base station, each of the identified one or more UEs for the corresponding identified set of resources.

In an additional aspect of the disclosure, a method of wireless communication includes receiving, at a UE, transmission type coordination signals from a serving base station, receiving radio frequency (RF) signals at the UE over an identified set of resources, determining a transmission type of the received signals based on the transmission type coordination signals, wherein the transmission type coordination signals relate to one or more possible transmission types to be expected by the UE in the identified set of resources, and processing, by the UE, the signals according to the determined transmission type.

In an additional aspect of the disclosure, an apparatus configured for wireless communication includes means for receiving, at a first base station, a request from a second base station to schedule one or more identifiable sets of UEs for a corresponding identified set of resources, means for identifying, by the first base station, one or more UEs according to parameters defining the one or more identifiable sets of UEs, and means for scheduling, by the first base station, each of the identified one or more UEs for the corresponding identified set of resources.

In an additional aspect of the disclosure, an apparatus configured for wireless communication includes means for receiving, at a UE, transmission type coordination signals from a serving, base station, receiving signals at the UE over an identified set of resources, means for determining a transmission type of the received signals based on the transmission type coordination signals, wherein the transmission type coordination signals relate to one or more possible transmission types to be expected by the UE in the identified set of resources, and means for processing, by the UE, the signals according to the determined transmission type.

In an additional aspect of the disclosure, a computer program product has a computer-readable medium having program code recorded thereon. This program code includes code to receive, at a first base station, a request from a second base station to schedule one or more identifiable sets of UEs for a corresponding identified set of resources, code to identify, by the first base station, one or more UEs according to parameters defining the one or more identifiable sets of UEs, and code to schedule, by the first base station, each of the identified one or more UEs for the corresponding identified set of resources.

In an additional aspect of the disclosure, a computer program product has a computer-readable medium having program code recorded thereon. This program code includes code to receive, at a UE, transmission type coordination signals from a serving base station, code to receive signals at the UE over an identified set of resources, code to determine a transmission type of the received signals based on the transmission type coordination signals, wherein the transmission type coordination signals relate to one or more possible transmission types to be expected by the UE in the identified set of resources, and code to process, by the UE, the signals according to the determined transmission type.

In an additional aspect of the disclosure, an apparatus includes at least one processor and a memory coupled to the processor. The processor is configured to receive, at a first base station, a request from a second base station to schedule one or more identifiable sets of UEs for a corresponding identified set of resources, to identify, by the first base station, one or more UEs according to parameters defining the one or more identifiable sets of UEs, and to schedule, by the first base station, each of the identified one or more UEs for the corresponding identified set of resources.

In an additional aspect of the disclosure, an apparatus includes at least one processor and a memory coupled to the processor. The processor is configured to receive, at a UE, transmission type coordination signals from a serving base station, to receive signals at the UE over an identified set of resources, to determine a transmission type of the received signals based on the transmission type coordination signals, wherein the transmission type coordination signals relate to one or more possible transmission types to be expected by the UE in the identified set of resources, and to process, by the UE, the signals according to the determined transmission type.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
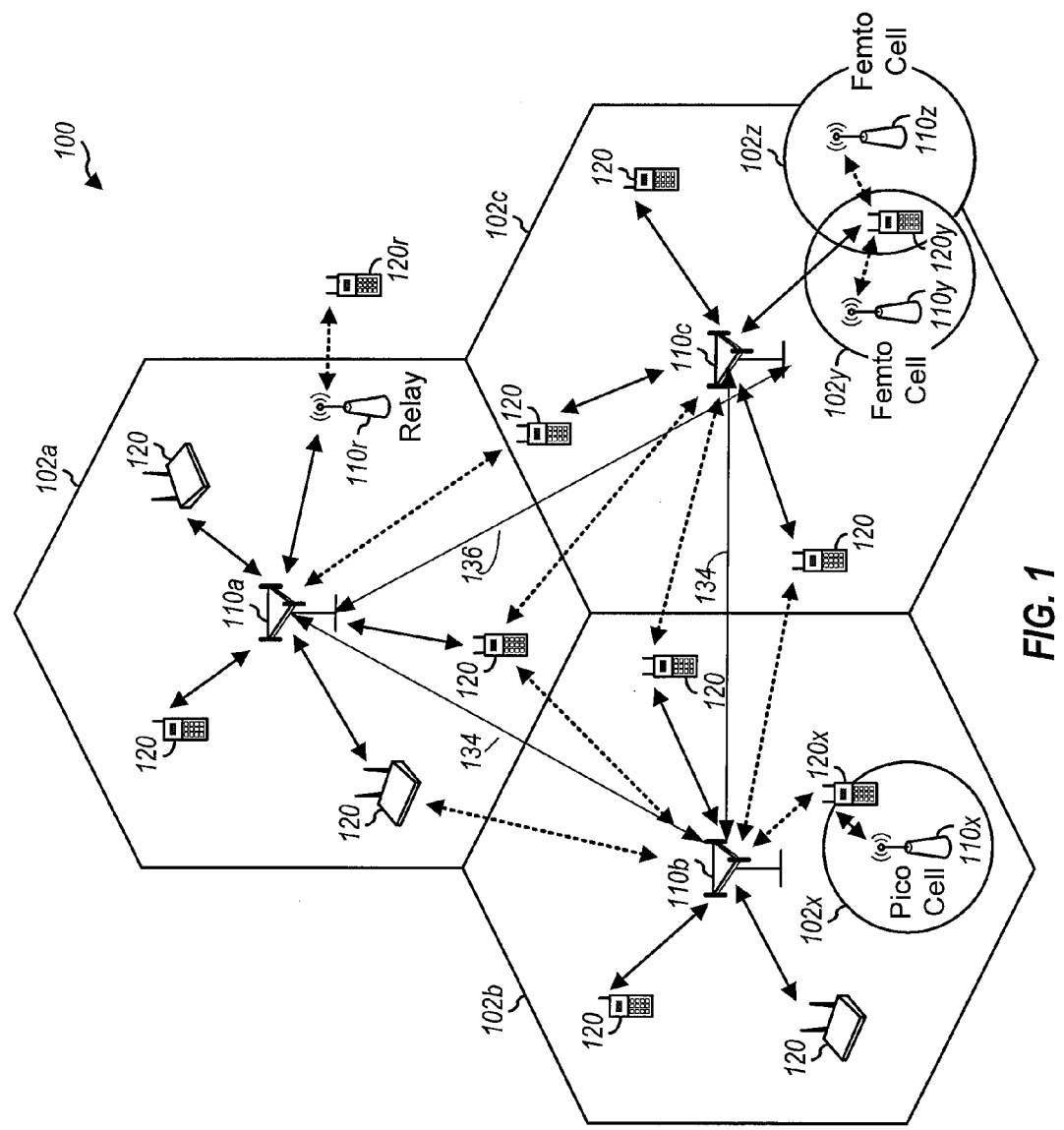
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. A number of resource elements may be available in each symbol period. A UE may be within the coverage of multiple eNBs. One of these eNBs may be selected to serve the UE. The serving eNB may be selected based on various criteria such as received power, path loss, signal-to-noise ratio (SNR), etc. The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system, allowing for propagation delay and other expected timing differences.

While timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 2:
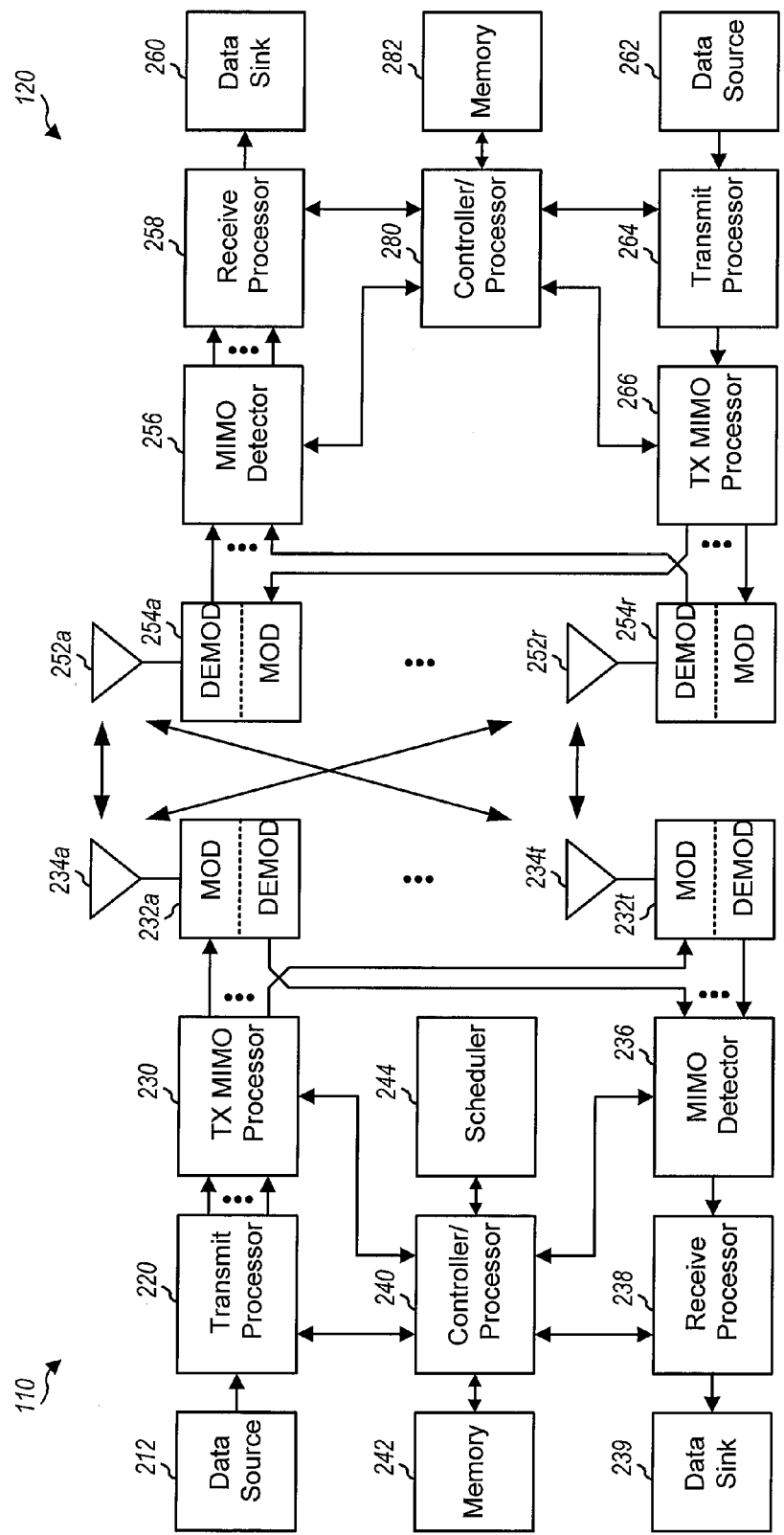
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 224a through 224r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 4 and 5, and/or other processes for the techniques described herein. The memories 242 and 282 may store data and program codes for the eNB 110 and the UE 120, respectively. A scheduler 244 may schedule UEs for data transmission on the downlink and/or uplink.

As wireless communication technologies advance, there may be different types of UEs having varying capabilities according to various legacy or advanced standards releases that will coexist in a single deployment. For example, in LTE, some UEs may have the capability to perform common reference signal (CRS)-interference cancellation (IC) and/or control/data IC. Other compatible LTE UEs may not support such IC features. Additionally some UEs may support different sets of features that are defined in multiple LTE standards releases. For example, UEs designed and manufactured according to LTE Release (Rel)-8 may not support features defined in LTE Rel-9 and later. Moreover, one UE designed and manufactured according to Rel-11 UE may support EPDCCH while another UE designed and manufactured according to Rel-11 may not support the EPDCCH feature. Further still, one UE may support demodulation (DM)-RS-based PDSCH, while another UE may only support CRS-based PDSCH. With the multiplicity of different UEs in a given system that may have various different, and often incompatible capabilities, UE performance may be impacted in UE operations, such as data IC, proper signal reception, and the like.

For example, a UE with blind detectors for data IC may need to detect whether interference in one physical resource block (PRB) is based on a signal transmitted using CRS-based PDSCH or UE-RS-based PDSCH. The UE may also need to detect whether there is multi-user (MU)-MIMO from the interfering cell or serving cell, and whether either of the cells use orthogonal or non-orthogonal UE-RS sequences. Additionally, a UE may need to detect the number of UE-RS ports used by an interfering cell in order to properly cancel such interference. While it is feasible to have blind detectors attempt all such hypotheses, UEs which operate such blind detectors may require higher complexity or higher power consumption in order to achieve the desired performance.

In another example where performance may be impacted by the presence of multiple UEs having varying UE capabilities is in decoding of EPDCCH. Unlike PDCCH, which are transmitted over the entire PRB, EPDCCH are only transmitted in partial resource blocks (RBs). Thus, for some PRBs, an interfering eNB transmitting EPDCCH that only occupies fractions of a set of PRBs may cause signal processing inaccuracies for Rel-8 UEs. For example, if a Rel-8 UE is assigned PDSCH that includes one or more of these PRBs, because the EPDCCH interference may not occur over the full PRBs, the Rel-8 UE may have the incorrect noise estimation for PDSCH demodulation/decoding.

Figure 3A:
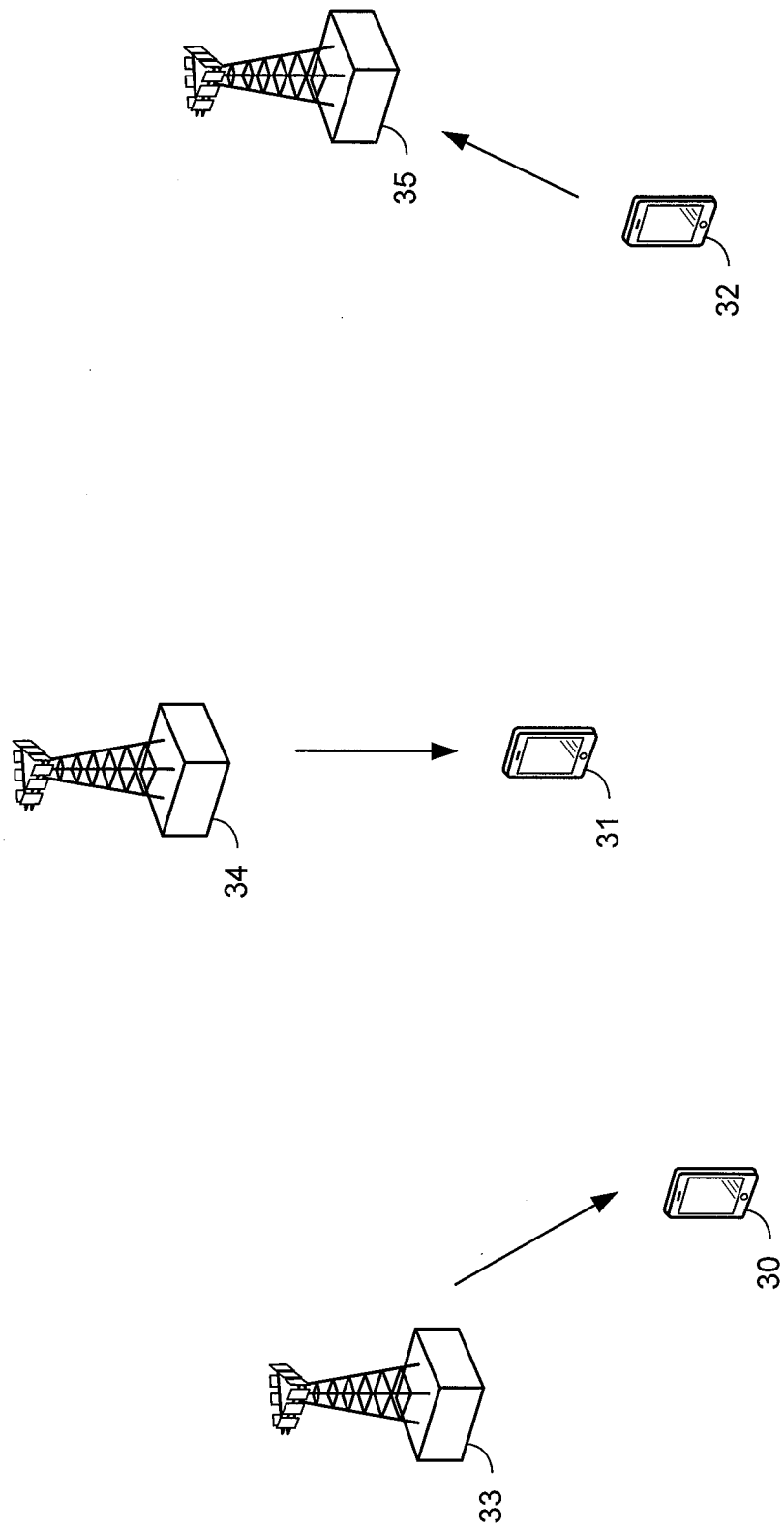
FIG. 3A is a block diagram illustrating eNBs and UEs configured according to one aspect of the present disclosure.

FIG. 3A is a block diagram illustrating eNBs 33-35 and UEs 30-32 configured according to one aspect of the present disclosure. The network in which eNBs 33-35 are located operates using a time division duplex (TDD). There are three eNBs, eNBs 33-35, in the network illustrated in FIG. 3A, where eNB 33 and eNB 34 are configured for downlink transmissions in a current subframe to UE 30 and UE 31, respectively, while the current subframe is configured as an uplink transmission subframe by eNB 35 for UE 32, which transmits uplink signals to eNB 35. From UE 30's perspective, UE 30 receives downlink signals from its serving eNB, eNB 33. UE 30 sees interfering signals not only from eNB 34 (downlink) but also from UE 32 (uplink). Similarly, UE 31 sees interference from eNB 33 (downlink) and UE 32 (uplink).

Without eNB coordination, UE 30 would blindly detect the transmission type of the downlink signals from eNB 34 and the uplink signals of UE 32. Similarly, UE 31 would blindly detect the transmission type of the downlink signals from eNB 33 and the uplink signals of UE 32. A complicated detection method would be used to perform the blind detection at the UE side because of the mixture of uplink and downlink signals. Thus, performing such a blind detection method would involve high computation complexity and high power consumption.

With eNB coordination, eNBs 33-35 can agree to schedule UEs 30-32 with the same capabilities in the same resource slots. For example, eNBs 33-35 can schedule UE reference signal (RS) based PDSCH transmission to UERS-capable UEs in the current subframe. Therefore, UE 30 can then assume both the downlink interfering signals it sees from eNB 34 and the uplink interfering signals it sees from UE 32 are UERS based. Similarly, UE 31 can also assume that all interfering signals it sees are UERS based.

Figure 3B:
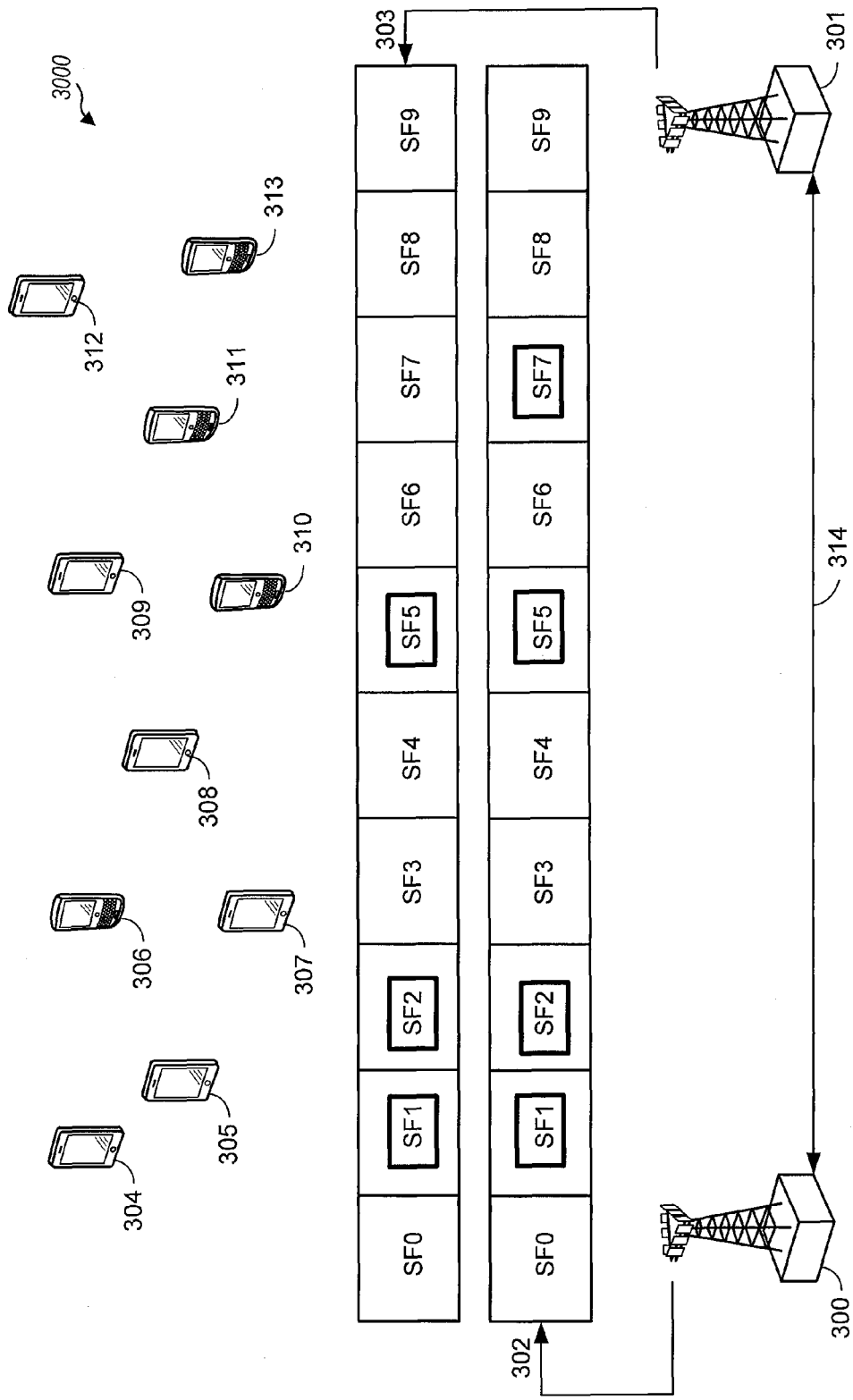
FIG. 3B is a block diagram illustrating a wireless network having eNBs and UEs configured according to one aspect of the present disclosure.

Various additional aspects of the present disclosure are directed to provide for coordination among eNBs for handling specific types of UEs or UE capabilities. FIG. 3B is a block diagram illustrating wireless network 3000 having eNBs 300 and 301 and UEs 304-313 configured according to one aspect of the present disclosure. In one illustrated aspect of the present disclosure, eNBs 300 and 301 may send communication signals to each other over backhaul 314. In order to coordinate handling the various UE types and capabilities, eNB 300 may send a request to eNB 301 over backhaul 314 to schedule downlink communications for a specific type/release of UE on a certain number of subframes or portions of a subframe. Conversely, eNB 301 may also send a request over backhaul 314 to eNB 300 to schedule a specific type/release of UE on number of subframes.

FIG. 3B also illustrates transmission frames 302 and 303. Transmission frame 302 illustrates subframes 0-9 of a downlink transmission from eNB 300, while transmission frame 303 illustrates subframes 0-9 of a downlink transmission from eNB 301. In operations according to aspects of the present disclosure, eNB 300 transmits a request to eNB 301 to schedule Rel-8 UEs in SF1 303, to schedule UEs with CRS-based or UE-RS-based data IC with UE-RS signaling transmitted with 2-ports on SF2 303, and to schedule UEs with UE-RS-based PDSCH with UE-RS signaling transmitted with 4-ports on SF5 303. Similarly, eNB 301 transmits a request to eNB 300 to schedule Rel-8 UEs in SF1 302, to schedule UEs with CRS-based or UE-RS-based IC with UE-RS signaling transmitted with 2-ports on SF2 302, to schedule UEs with UE-RS-based PDSCH with UE-RS signaling transmitted with 4-ports on SF5 302, and to schedule Rel-11 UEs having EPDCCH capabilities to selected RBs of SF7 302.

With the selected aspects of eNB coordination, eNBs 300 and 301 are coordinating scheduling of UEs with similar types of transmissions, which may include UE-RS based transmission, as scheduled in SF 5 302 and 303, and by the number of UE-RS ports used, as scheduled in SF2 302 and 303 (2-ports) and SF5 302 and 303 (4-ports). Additionally, eNBs 300 and 301 schedule the UEs using selected resources units including whole subframes SFs1, 2, and 5 302 and 303, and partial RBs of subframes, such as the scheduling of the Rel-11 UEs having EPDCCH capabilities in selected RBs of SF7 302. Such coordination may also be based on the UE's capability, for example, in scheduling UEs supporting both CRS and UE-RS-based data IC in SF2 302 and 303. Thus, the various aspects of the present disclosure may provide for scheduling of UEs based on transmission type or UE capability, and may include scheduling an identified set of resources that may include whole subframes or individual resource blocks or elements within a subframe.

It should be noted that in various aspects of the present disclosure scheduling of UEs according to any of the parameters identified by an eNB may be provided for dynamic, semi-static, or static scheduling. For example, in a dynamic scheduling aspect, a control signal (e.g., PDCCH or EPDCCS) may include the information of the potentially-interfering cell's transmissions on the RBs assigned to the particular UE. In a semi-statically scheduled aspects, the UE may be signaled via RRC messages that a subset of the subframes from the interfering cell may be using a particular type of transmission. For a statically scheduled aspect, some resources may be reserved, such that a certain transmission type will be used by the interfering cell in such reserved resources.

In addition to providing for coordination of UE scheduling through backhaul messaging between eNBs, such as eNBs 300 and 301, aspects of the present disclosure may also provide for eNBs to signal the UEs of particular transmission types that may be expected. For example, eNBs 300 and 301 may explicitly signal to UEs 304-313 identification of the possible types of transmissions UEs 304-313 may see from one or more interfering cells in a subset of subframes and/or a fraction of a subframe.

Thus, eNB 300 may signal UE 306, which is a Rel-8 UE, that neighboring signals in SF2 303 will be from Rel-8 UEs. Similarly, eNBs 300 may signal UE 307, which is a UE having a UE-RS-based PDSCH transmission type, with UE-RS transmissions using 4-ports, to expect interference from transmission frame 303 at SF5 303 from UE-RS-based PDSCH transmissions using 4-ports. eNB 300 may also signal UE 308, which is a Rel-11 UE that has EPDCCH capabilities, that is should expect EPDCCH in part of SF7 302. Such signaling may be broadcast or unicast, may be based on control channel, or may be based on RRC signaling from the serving base station.

In additional aspects of the present disclosure, the signaling may be indirect signaling that is used by the UEs to determine the possible types of transmissions of interfering cells. Such signaling and determinations may be based on the UE's own assignments or based on the format of the UE assignment, such as the format of the DCI. For example, UEs 309 and 312 are scheduled by eNB 301 for UE-RS based transmission in SF5 303. Thus, UEs 309 and 312 may assume that interfering cells, such as from eNB 300, also transmit UE-RS based transmission at least in the RBs assigned to UEs 309 and 312.

In a further aspect illustrated in FIG. 3, UE 311 receives a DCI Format 1a from eNB 301. Based on the DCI Format 1a, UE 311 may determine that interference from neighbor cells may be CRS-based. Thus, when performing IC, UE 311 would use CRS-based IC for such neighboring interference signals. Similarly, receipt by UE 313 of a DCI Format 2b would prompt UE 313 to determine that neighboring interference may be UE-RS-based. Thus, when performing IC of neighbor interference, UE 313 would perform UE-RS-based IC. As such, by using the indirect signaling from the serving base stations or by analyzing the UEs' own assignments, determinations of the type of interfering transmission types may be made by the UEs, which would allow for less complexity of operations for data IC and advanced control detection, e.g., through EPDCCH.

In the various aspects of the present disclosure, the coordination between base stations may be based on pre-defined sets of UEs, such as UEs that are manufactured according to a certain release class (e.g., Rel-8 UEs, Rel-9 UEs, Rel-11 w/o EPDCCH UEs, and the like). When providing coordination between base stations to limit transmissions to such UEs, the sets of UEs to which these limitations will apply are predetermined based on the hardware and software of the UE.

In aspects where coordination between base stations may be based on a particular transmission type or other transmission limiting criteria, the set of UEs that may fall into such transmission limitations may be determined by the corresponding base station on a dynamic basis, such as by monitoring operational aspects of the UEs, bandwidth needs, supported interference cancellation capabilities, and the like. Thus, different aspects of the present disclosure may include coordination between the base stations based on characteristics that involve pre-defined sets and characteristics that involve sets that will be determined by the base station based on the parameters for that set, or some combination of both methods.

Figure 4A:
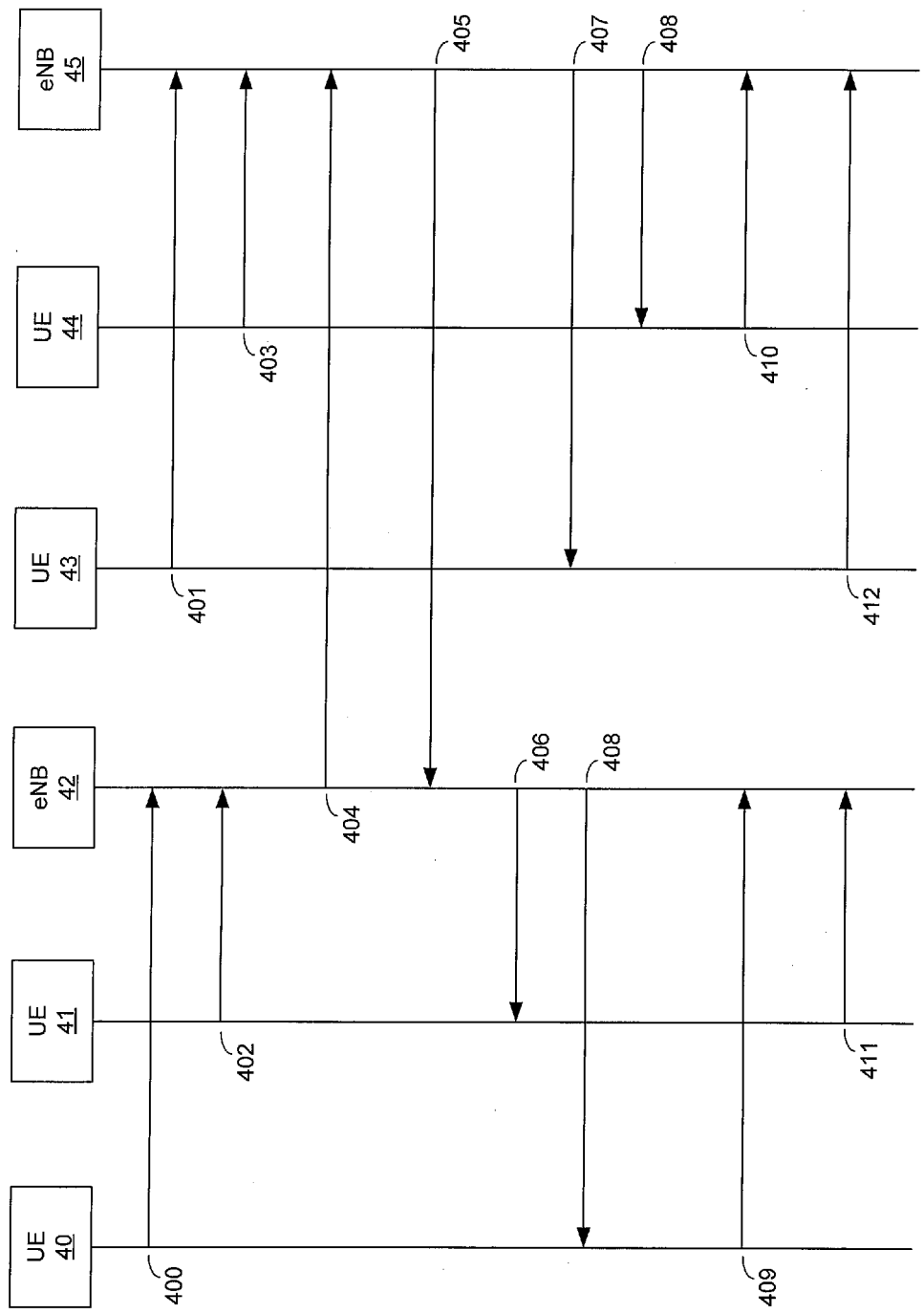
FIG. 4A is a timing diagram illustrating messaging between UEs and eNBs configured according to one aspect of the present disclosure.

FIG. 4A is a timing diagram illustrating messaging between UEs and eNBs configured according to one aspect of the present disclosure. UEs 40 and 41 are located within the service area of eNB 42. UE 40 is a Rel-11 UE with EPDCCH capabilities, while UE 41 is a Rel-8 UE. UEs 43 and 44 are located within the service area of eNB 45. UE 44, like UE 40, is a Rel-11 UE with EPDCCH capabilities, and UE 43, like UE 41, is a Rel-8 UE. At time, 400, UE 40 signals to eNB 42 a capabilities messages, which includes information that eNB 42 identifies the Rel-11 capabilities of UE 40, including that UE 40 has EPDCCH capabilities. At time 401, UE 43 also transmits a signal to eNB 45, which includes a capabilities message including information that UE 43 supports EPDCCH. At time, 402, UE 41 communicates with eNB 42 and, based on this communication, eNB 42 determines the capabilities of UE 41 as a Rel-8 UE.

Similarly, at time, 403, UE 44 communicates with eNB 45, after which eNB 45 determines UE 44 is a Rel-8 UE.

In determining the capabilities of UEs 40 and 41, eNB 42 determines to coordinate scheduling of communications with UEs 40 and 41 and sends a coordinating message to eNB 45 at time 404. Similarly, at time 405, eNB 45, after determining the capabilities of UEs 43 and 44, sends a coordinating message to eNB 42. In one aspect, as eNB 45 received a coordinating message from eNB 42 at time 404, eNB 45 may formulate proposed scheduling using the information from eNB 42's coordinating message.

At times 406 and 407, eNB 42 sends scheduling grants for uplink communications to UEs 40 and 41, respectively. Similarly, at times 407 and 408, eNB 45 sends scheduling grants for uplink communications to UEs 43 and 44. The scheduling grants sent by eNBs 42 and 45 provide coordinated scheduling for uplink communications by UEs 40, 41, 43, and 44. The scheduling grants provide for grouping the Rel-11 UEs, UEs 40 and 43, together for particular resource blocks (RBs) of the scheduled subframe, and grouping the Rel-8 UEs, UEs 41 and 43, for a different subframe. For example, at times 409 and 410, UEs 40 and 43 transmit uplink data according to the coordinated scheduling. UEs 40 and 43 transmit during scheduled RBs of a first scheduled subframe. At times 411 and 412, UEs 41 and 44 transmit uplink data according to the coordinated scheduling during a second scheduled subframe.

Figure 4B:
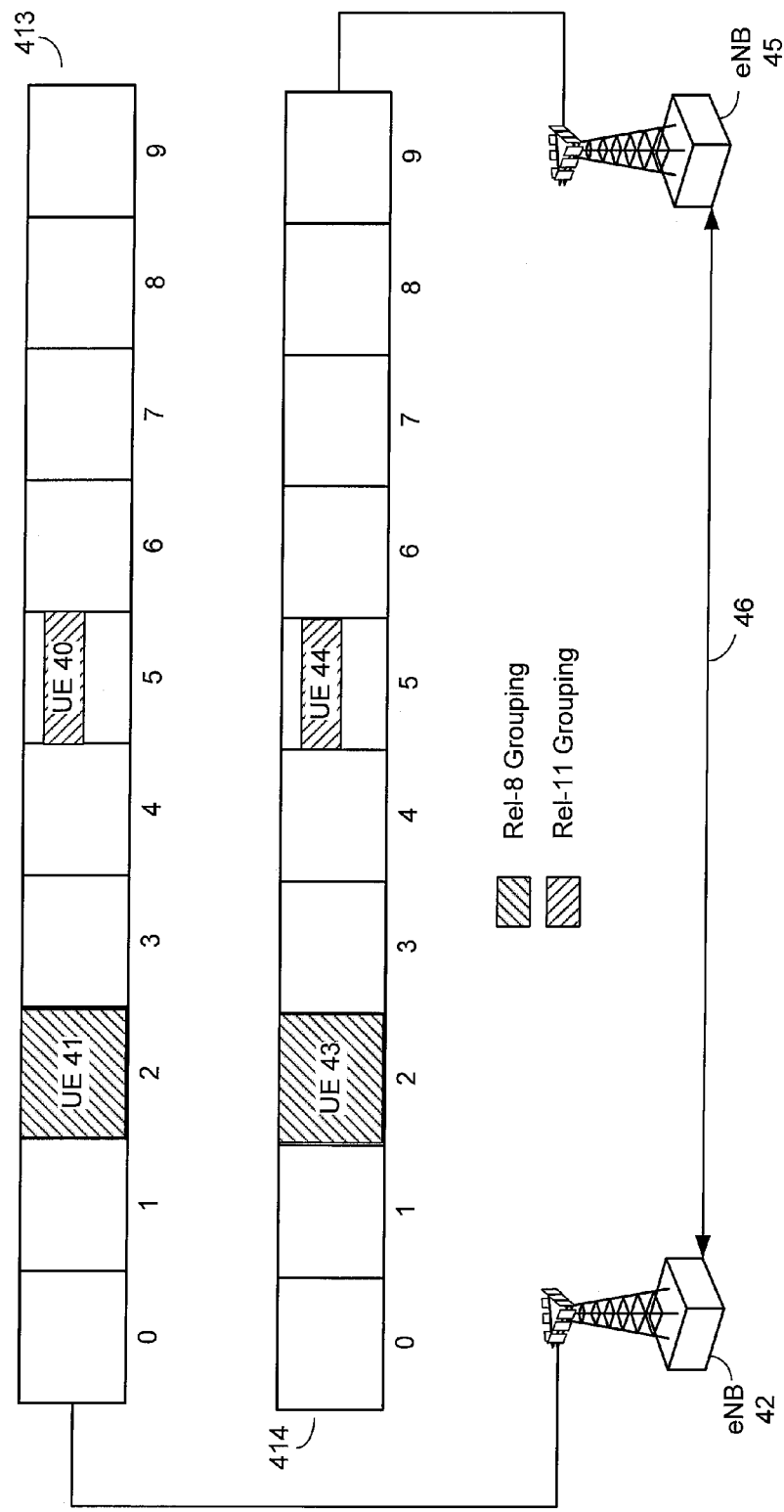
FIG. 4B is a block diagram illustrating eNBs configured according to one aspect of the present disclosure.

FIG. 4B is a block diagram illustrating eNBs 42 and 45 configured according to one aspect of the present disclosure. As illustrated in FIG. 4A, eNBs 42 and 45 receive capabilities information from UEs, such as UEs 40 and 44, and determine capabilities of UEs, such as UEs 41 and 43. Transmission frame 413 is scheduled by eNB 42 for communications with served UEs, such as UEs 40 and 41, and transmission frame 414 is scheduled by eNB 45 for communications with its served UEs, such as UEs 43 and 44. When the capabilities of the served UEs are obtained, eNBs 42 and 45 transmit coordinating messages to each other over backhaul 46. Through the coordinating messages, eNBs 42 and 45 schedule Rel-8 UEs, such as UEs 41 and 43 on the second subframes of their respective transmission frames, transmission frames 413 and 414, and schedule Rel-11 UEs, such as UEs 40 and 45, for a portion of resources on subframe 5 of transmission subframes 413 and 414. With Rel-11 capabilities, eNBs 42 and 45 may schedule compatible UEs for uplink transmissions on particular partial resources within a subframe, such as scheduling individual RBs, resource elements (REs), resource element groups (REGs), and the like.

It should be noted that eNBs configured according to various aspects of the present disclosure may schedule resources within a transmission frame based on UE capabilities either in TDD transmissions or FDD transmissions.

Figure 5:
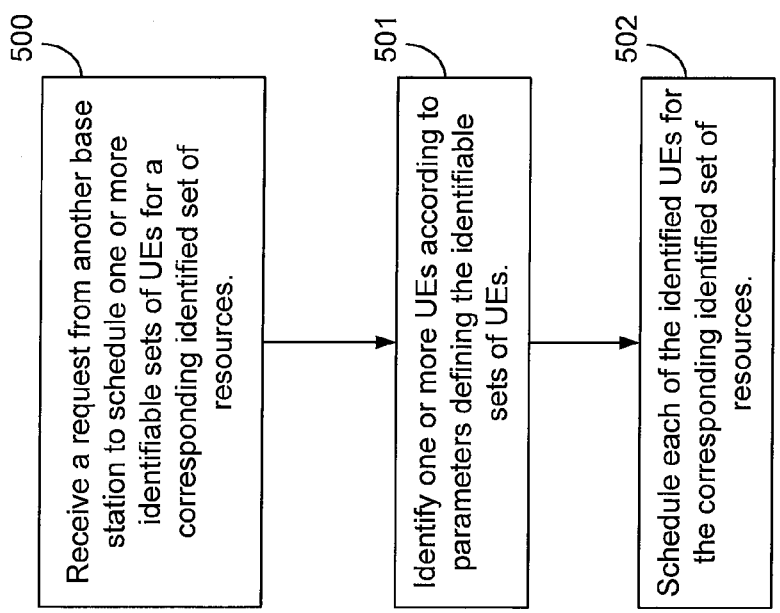
FIG. 5 is a block diagram illustrating example blocks executed to implement one aspect of the present disclosure.

FIG. 5 is a block diagram illustrating example blocks executed to implement one aspect of the present disclosure. At block 500, a request is received at a first base station from a second base station to schedule one or more identifiable sets of UEs for a corresponding identified set of resources. The request from one base station may be sent to the other base station over the backhaul link between the two base stations, such as backhaul 314 (FIG. 3B). The base stations that are capable of such aspects include eNBs 33-35, 300, and 301 (FIGS. 3A and 3B), as well as eNB 110 (FIG. 2), which may perform the various actions under control of controller/processor 240.

At block 501, the first base station identifies one or more UEs according to various parameters defining the identifiable sets. Each of the identifiable sets may be defined using parameters such as transmission type, UE capability, UE release type, and the like. The first base station will identify the different UEs based on those transmission type/UE capability criteria and group UEs having the similar parameters into the identifiable groups.

At block 502, the first base station schedules each of the identified UEs for the corresponding identified set of resources. After grouping the UEs according to the similar parameters that define the different identifiable groups of UEs, the base station will then schedule the UEs to corresponding sets of resources. For example, certain UEs grouped according to a particular transmission type may be scheduled for a set of subframes, while another group of UEs having a particular capability are scheduled to a set of RBs within a subframe or for a portion of a subframe. Other groups, defined by various combinations of transmission type and/or UE capability may be scheduled for other corresponding sets of resources, which may also be whole or partial subframes. Such scheduling may be provided for either dynamically, semi-statically, or statically according to operator preferences.

Figure 6:
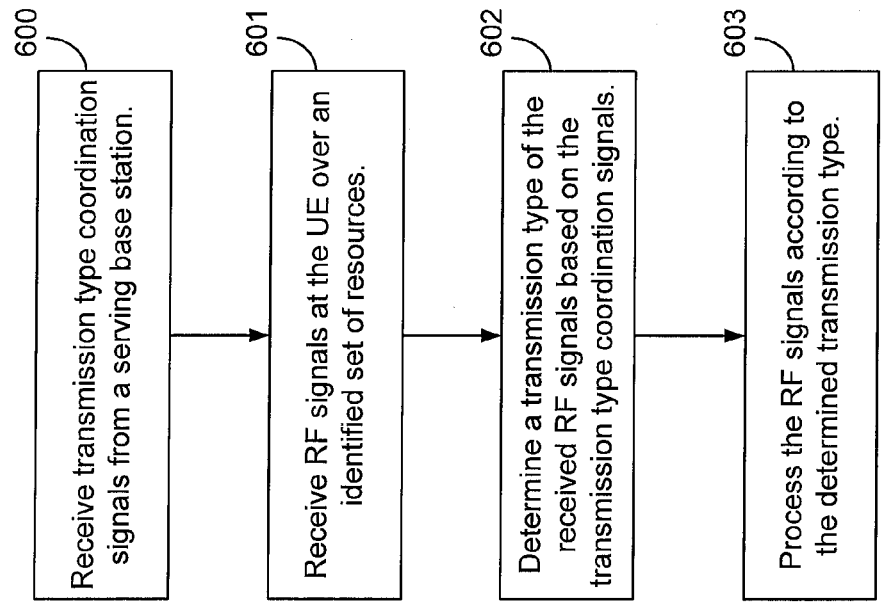
FIG. 6 is a block diagram illustrating example blocks executed to implement one aspect of the present disclosure.

FIG. 6 is a functional block diagram illustrating example blocks executed to implement one aspect of the present disclosure. At block 600, a UE receives transmission type coordination signals from a serving base station. The transmission type coordination signals relate to one or more possible transmission types to be expected by the UE in an identified set of resources and may be received either in a broadcast from the serving base station, in a unicast signal specifically to the UE, in a control channel from the serving base station, in a radio resource control (RRC) signal from the serving base station, or the like.

The signals may be direct signals, which specifically inform the UEs of the types of transmissions that may be expected or may be indirect signals that reflect an assignment to the UE. For example, the coordination signals may be a downlink assignment for the UE that the UE uses to determine the type of signals to expect based on the downlink assignment or the uplink transmission type assigned to the UE in the downlink assignment. The UE may also be able to determine the transmission type to expect based on the format of the downlink assignment signal. UEs, such as UEs 30-32 and 304-313 (FIGS. 3A and 3B) and UE 120 (FIG. 2) may perform such operations under control of controller/processor 280.

At block 601, the UE receives signals over an identified set of resources. Signals are expected in wireless communications at the UE. Depending on the context of the transmissions, the signals may be data or control signals transmitted from the UE's serving base station or the signals may be interference received from a neighboring base station or transmitter. The identified set of resources may include one or more resource elements of a subframe or one or more subframes, either in TDD or FDD communications. The signals received by the UE may be interference signals from one or more neighboring cells or neighboring UEs, data signals from the serving base station, an EPDCCH, or the like.

At block 602, the UE determines the transmission type of the received signals based on the transmission type coordination signals. The transmission type coordination signals received from the serving base station allow the UE to expect a certain transmission type in the identified set of resources. For example, in the context of interfering signals from a neighbor cell, the transmission type coordination signals from the serving base station may inform the UE of how to best cancel the interference. For example, if the signal suggests that the signals are UE-RS based PDSCH signals, the receiving UE may perform UE-RS-based interference cancellation of the RF signal. Thus, the UE will either directly know the transmission type through a direct signal or may determine what the transmission type is based on the signal. For example, if the UE is allocated for CRS-based transmissions, then it may, instead, determine that the interfering signals are also CRS-based transmissions. The allocation signal may be based on the DCI format received, as previously described, or may be simply based on the allocation and capabilities of the UE.

At block 603, the UE may then process the signals according to the determined transmission type. As noted above, if the context of the signals is an interfering signal from a neighbor cell, then the UE may perform interference cancellation using the appropriate cancellation techniques informed by the determined transmission type or joint processing between the serving base station and the interfering neighboring entities. If, however, the context of the signals is a signal from the serving base station, the UE may be able to process, for example, by decoding data signals from the serving base station or, process an EPDCCH from the serving cell, as the UE will expect such a partial RB transmission of the enhanced control channel. Accordingly, with the determination of transmission type, the complexity of the signal processing is reduced.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a first base station, a request from a second base station to schedule one or more identifiable sets of user equipments (UEs) for a corresponding identified set of resources;
   identifying, by the first base station, one or more UEs according to parameters defining the one or more identifiable sets of UEs, wherein the parameters associated with at least one of the one or more identifiable sets of UEs include a transmission type, and wherein the identifying comprises:
      identifying the transmission type for each of the one or more UEs; and
      grouping UEs of the one or more identified UEs having a same transmission type into a same set of UEs; and
   scheduling, by the first base station, each of the identified one or more UEs for the corresponding identified set of resources, wherein the first base station schedules the UEs of the one or more UEs identified as having the same transmission type to a corresponding same set of resources, and wherein the scheduling occurs one of dynamically, semi-statically, or statically.

2. The method of claim 1, wherein the corresponding same set of resources includes one of:
   one or more resource elements of a subframe; or
   one or more subframes.

3. The method of claim 1, further comprising:
   transmitting, by the first base station, a scheduling request to the second base station to schedule one or more additional identifiable sets of UEs for a corresponding identified additional set of resources.

4. The method of claim 3, wherein one or more of: the receiving and the transmitting occurs over a backhaul communication link between the first base station and the second base station.

5. An apparatus configured for wireless communication, comprising:
   means for receiving, at a first base station, a request from a second base station to schedule one or more identifiable sets of user equipments (UEs) for a corresponding identified set of resources;
   means for identifying, by the first base station, one or more UEs according to parameters defining the one or more identifiable sets of UEs, wherein the parameters associated with at least one of the one or more identifiable sets of UEs include a transmission type, and wherein the means for identifying comprises:
      means for identifying the transmission type for each of the one or more UEs; and
      means for grouping UEs of the one or more identified UEs having a same transmission type into a same set of UEs; and
   means for scheduling, by the first base station, each of the identified one or more UEs for the corresponding identified set of resources, wherein the first base station schedules the UEs of the one or more UEs identified as having the same transmission type to a corresponding same set of resources, and wherein the means for scheduling occurs one of dynamically, semi-statically, or statically.

6. The apparatus of claim 5, wherein the corresponding same set of resources includes one of:
   one or more resource elements of a subframe; or
   one or more subframes.

7. The apparatus of claim 5, further comprising:
   means for transmitting, by the first base station, a scheduling request to the second base station to schedule one or more additional identifiable sets of UEs for a corresponding identified additional set of resources.

8. The apparatus of claim 7, wherein one or more of: the means for receiving and the means for transmitting occurs over a backhaul communication link between the first base station and the second base station.

9. A non-transitory computer-readable medium having program code recorded thereon, the program code comprising:
   program code for causing a computer to receive, at a first base station, a request from a second base station to schedule one or more identifiable sets of user equipments (UEs) for a corresponding identified set of resources;
   program code for causing the computer to identify, by the first base station, one or more UEs according to parameters defining the one or more identifiable sets of UEs, wherein the parameters associated with at least one of the one or more identifiable sets of UEs include a transmission type, wherein the program code for causing the computer to identify comprises:
      program code for causing the computer to identify the transmission type for each of the one or more UEs; and
      program code for causing the computer to group UEs of the one or more identified UEs having a same transmission type into a same set of UEs; and
   program code for causing the computer to schedule, by the first base station, each of the identified one or more UEs for the corresponding identified set of resources, wherein the first base station schedules the UEs of the one or more UEs identified as having the same transmission type to a corresponding same set of resources, and wherein the program code for causing the computer to schedule occurs one of dynamically, semi-statically, or statically.

10. The non-transitory computer-readable medium of claim 9, further comprising:
    program code for causing the computer to transmit, by the first base station, a scheduling request to the second base station to schedule one or more additional identifiable sets of UEs for a corresponding identified additional set of resources.

11. An apparatus configured for wireless communication, the apparatus comprising:
    a memory;
    at least one processor coupled to the memory, the at least one processor configured to:
       receive, at a first base station, a request from a second base station to schedule one or more identifiable sets of user equipments (UEs) for a corresponding identified set of resources;
       identify, by the first base station, one or more UEs according to parameters defining the one or more identifiable sets of UEs, wherein the parameters associated with at least one of the one or more identifiable sets of UEs include a transmission type, and wherein the configuration of the at least one processor to identify comprises:
  configuration of the at least one processor to identify the transmission type for each of the one or more UEs; and
  configuration of the at least one processor to group UEs of the one or more identified UEs having a same transmission type into a same set of UEs; and
schedule, by the first base station, each of the identified one or more UEs for the corresponding identified set of resources, wherein the first base station schedules the UEs of the one or more UEs identified as having the same transmission type to a corresponding same set of resources, wherein the configuration of the at least one processor to schedule occurs one of dynamically, semi-statically, or statically.

12. The apparatus of claim 11, wherein the corresponding same set of resources includes one of:
  one or more resource elements of a subframe; or
  one or more subframes.

13. The apparatus of claim 11, further comprising configuration of the at least one processor to transmit, by the first base station, a scheduling request to the second base station to schedule one or more additional identifiable sets of UEs for a corresponding identified additional set of resources.

14. The apparatus of claim 13, wherein one or more of: the configuration of the at least one processor to receive and the configuration of the at least one processor to transmit occurs over a backhaul communication link between the first base station and the second base station.

* * * * *